(12) United States Patent
Boyes (10) Patent No.: US 7,073,473 B2
(45) Date of Patent: Jul. 11, 2006

(54) INTAKE MANIFOLD VARIABLE RUNNER AREA

(75) Inventor: Andrew Boyes, Aurora (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 10/873,800

(22) Filed: Jun. 22, 2004

(65) Prior Publication Data

US 2005/0028778 A1 Feb. 10, 2005

Related U.S. Application Data

(63) Continuation-in-part of application No. 10/496,602, filed as application No. PCT/CA03/01088 on Jul. 18, 2003.

(51) Int. Cl.
 *F02B 17/18* (2006.01)
(52) U.S. Cl. .................................. 123/184.56
(58) Field of Classification Search ..............................
 123/184.21–184.61, 401, 403, 391
 See application file for complete search history.

(56) References Cited

U.S. PATENT DOCUMENTS

| | | | |
|---|---|---|---|
| 871,320 A | 11/1907 | Bollee | |
| 1,397,482 A | 11/1921 | Bachle | |
| 2,894,497 A | 7/1959 | Bolles, Jr. | |
| 3,999,522 A | 12/1976 | Jaulmes | |
| 4,210,107 A | 7/1980 | Shaffer | |
| 4,231,971 A | 11/1980 | Armstrong | |
| 4,274,368 A | 6/1981 | Shaffer | |
| 4,428,334 A | 1/1984 | Klomp | |
| 4,465,035 A | 8/1984 | Carr | |
| 4,590,895 A | 5/1986 | Yada et al. | |
| 4,805,573 A | 2/1989 | Macfarlane et al. | |
| 4,862,840 A | 9/1989 | Matsunaga et al. | |
| 4,911,111 A | 3/1990 | Matsunaga et al. | |
| 4,928,638 A | 5/1990 | Overbeck | |
| 4,977,866 A | 12/1990 | Wilkins | |
| 5,063,885 A * | 11/1991 | Yoshioka ............... 123/184.34 |
| 5,311,848 A | 5/1994 | Isaka et al. | |
| 5,438,964 A | 8/1995 | Breidenbach | |
| 5,642,697 A | 7/1997 | Jahrens et al. | |
| 5,662,086 A | 9/1997 | Piccinini | |
| 5,687,684 A | 11/1997 | Verkleeren | |
| 5,722,358 A | 3/1998 | Fuesser et al. | |
| 5,749,342 A | 5/1998 | Chao | |

(Continued)

FOREIGN PATENT DOCUMENTS

DE 3807 159 3/1988

(Continued)

*Primary Examiner*—Marguerite McMahon
(74) *Attorney, Agent, or Firm*—Clark Hill PLC (57) ABSTRACT

A tunable intake manifold is provided for directing a flow of air between a plenum and an internal combustion engine. The tunable intake manifold includes a manifold housing defining an interior. The manifold housing has a plurality of runner walls extending through the interior. The tunable intake manifold also includes a slider having a slider wall having an angled portion separated from a primary portion by a curved portion. The slider wall extends through the interior of the manifold housing. The slider wall cooperates with the runner wall to define a runner having a defined cross sectional area for transporting the flow of air therethrough. The slider is slidably engaged with the manifold housing for moving the slider wall relative to the runner wall to selectively change the defined cross sectional area of the runner, such that the volume of air passing therethrough changes with the movement of the slider. The angled portion of the slider travels parallel to the runner wall at a transmitting end of the runner.

15 Claims, 11 Drawing Sheets

U.S. PATENT DOCUMENTS

| | | |
|---|---|---|
| 5,762,036 A | 6/1998 | Verkleeren |
| 5,787,852 A | 8/1998 | Muramatsu et al. |
| 5,797,365 A | 8/1998 | Kim |
| 5,823,157 A | 10/1998 | Muramatsu |
| 5,890,464 A | 4/1999 | Martinelli |
| 5,950,587 A | 9/1999 | Sattler et al. |
| 6,105,545 A | 8/2000 | Breidenbach |
| 6,216,656 B1 * | 4/2001 | Hada et al. ............ 123/184.34 |
| 6,216,657 B1 | 4/2001 | Paffrath et al. |
| 6,234,132 B1 * | 5/2001 | Kopec et al. .......... 123/184.34 |
| 6,289,864 B1 | 9/2001 | Vide et al. |
| 6,357,410 B1 | 3/2002 | Rutschmann |
| 6,367,440 B1 | 4/2002 | Husges |
| 6,431,136 B1 | 8/2002 | Pietrowski et al. |
| 6,568,366 B1 | 5/2003 | Dietz et al. |
| 6,591,804 B1 | 7/2003 | Matsumoto et al. |
| 6,591,805 B1 | 7/2003 | Karlsson et al. |
| 2001/0010213 A1 | 8/2001 | Umino et al. |
| 2002/0139340 A1 | 10/2002 | Matsumoto et al. |
| 2002/0152982 A1 | 10/2002 | Pietrowski et al. |

FOREIGN PATENT DOCUMENTS

| | | |
|---|---|---|
| DE | 38 07 159 A1 * | 9/1989 |
| DE | 195 31 985 | 8/1995 |
| EP | 0 483 581 | 10/1991 |

* cited by examiner

INTAKE MANIFOLD VARIABLE RUNNER AREA

RELATED APPLICATION

This application is a continuation in part application of U.S. patent application Ser. No. 10/496,602, filed May 25, 2004, which is the National Stage of PCT/CA03/01088, filed Jul. 18, 2003.

FIELD OF THE INVENTION

The invention relates to a tunable intake manifold for an internal combustion engine. More specifically, the invention relates to a tunable intake manifold having runners with adjustable cross-sectional areas.

DESCRIPTION OF THE RELATED ART

Air intake manifolds for internal combustion engines are used to transport and direct air and fuel to the cylinders of the internal combustion engine. The intake manifold receives the air from a plenum. Once the air leaves the plenum, the manifold directs the air to the individual cylinders where it is received and used in combustion.

The geometry of each of the runners in the intake manifold dictate how efficient the transportation of the air to the cylinders of the internal combustion engine is. The length and the cross-sectional area of the runners directly affect the pressure and velocity at which the air reaches the cylinders.

The design of the runner is typically made to optimize the performance of the internal combustion engine at a specific speed thereof. While optimization occurs at a specific speed, compromises in performance are made at every other speed in which the internal combustion engine operates. Therefore, there is a need to successfully control the pressure and velocity of the air as it passes through the runners of the intake manifold allowing optimization of the internal combustion engine performance at a plurality of speeds.

U.S. Pat. No. 4,210,107, issued to Shaffer on Jul. 1, 1980, discloses a tunable intake manifold. The intake manifold includes a plurality of intake runners, each having a side wall that is adjustable throughout the length of each of the intake runners. The adjustable side walls move transversely inwardly and outwardly with respect to the flow direction of the air throughout the intake runner to correspondingly decrease and increase the through flow cross-sectional area. While such an adjustable side wall may adjust the cross-sectional area of each of the runners, the side wall creates a space between the side wall and the side of the runner that the side wall has moved away from. This unused volume is not sealed and may receive portions of the air as it passes thereby, which will reduce the effectiveness of the device and create inefficiencies in the intake runners. In addition, these spaces may induce unwanted turbulence in the intake runners.

SUMMARY OF THE INVENTION

According to one aspect of the invention, a tunable intake manifold is provided for directing a flow of air between a plenum and an internal combustion engine. The tunable intake manifold includes a manifold housing defining an interior. The manifold housing has a plurality of runner walls extending through the interior. The tunable intake manifold also includes a slider having a slider wall having an angled portion separated from a primary portion by a curved portion. The slider wall extends through the interior of the manifold housing. The slider wall cooperates with the runner wall to define a runner having a defined cross sectional area for transporting the flow of air therethrough. The slider is slidably engaged with the manifold housing for moving the slider wall relative to the runner wall to selectively change the defined cross sectional area of the runner, such that the volume of air passing therethrough changes with the movement of the slider. The angled portion of the slider travels parallel to the runner wall at a transmitting end of the runner.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figures 1, 2:
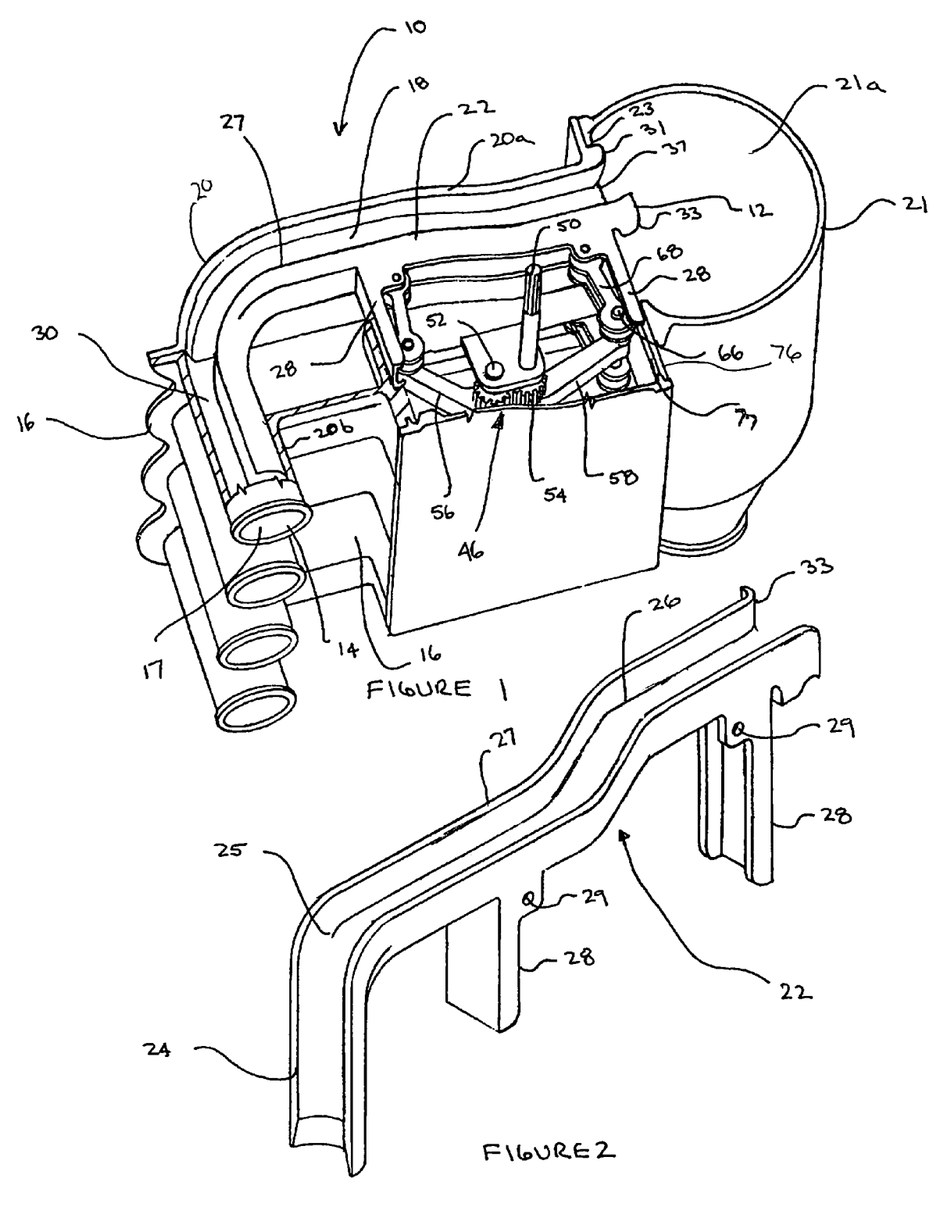
FIG. 1 is a cut-away perspective view of the intake manifold with a portion of a manifold housing removed therefrom.
FIG. 2 is a perspective view of a moveable slider.
Figure 3:
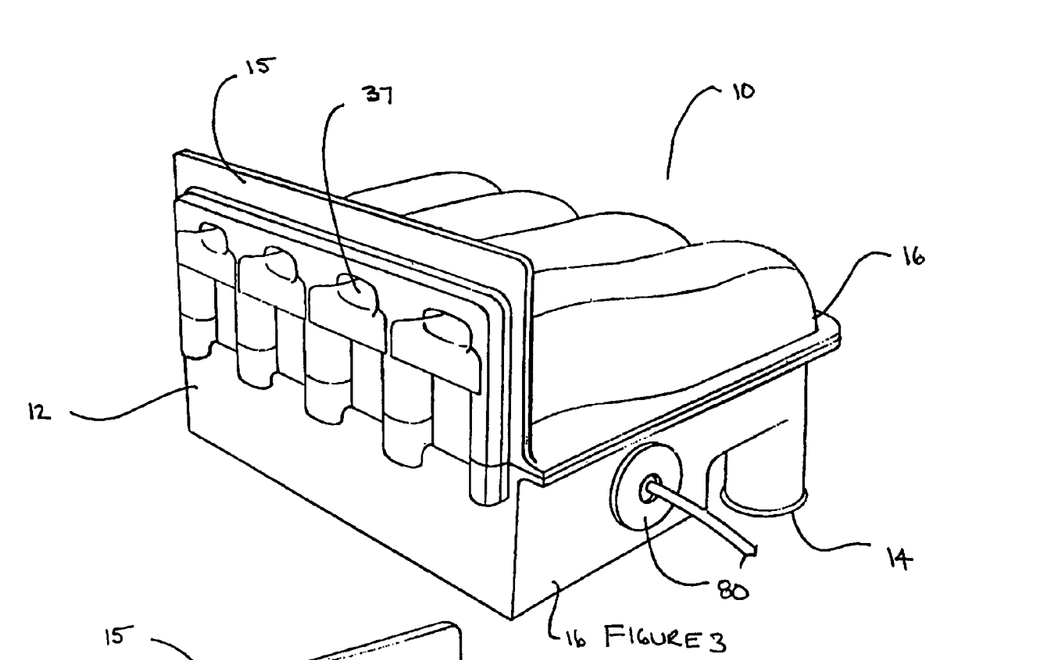
FIG. 3 is a front perspective view of the intake manifold.
Figure 4:
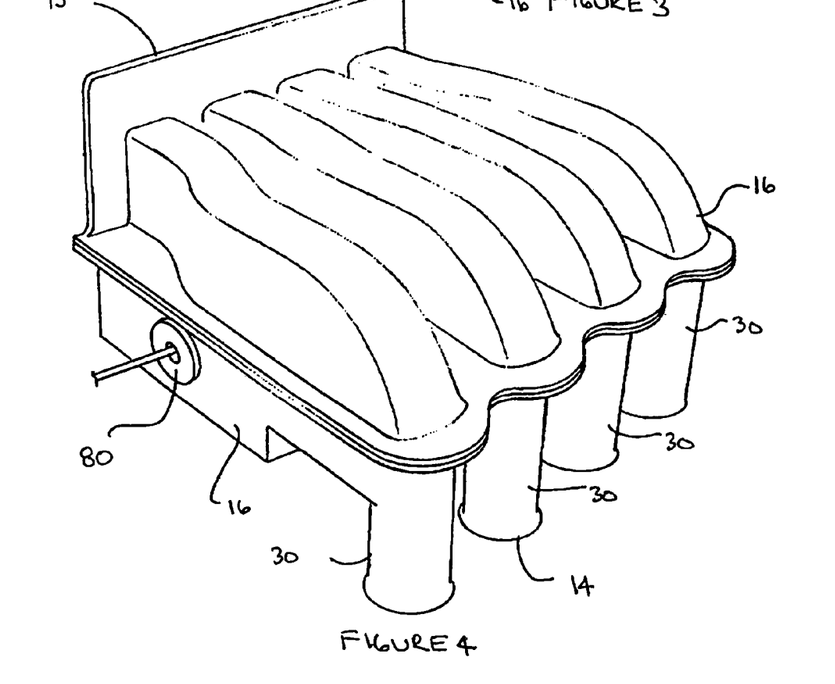
FIG. 4 is a rear perspective view of the intake manifold.

Referring to FIG. 1, a tunable intake manifold is generally indicated at 10. The tunable intake manifold 10 extends between a receiving end 12 and a transmitting end 14 defined by a plurality of ports 17. The tunable intake manifold 10 includes a manifold housing 16 that extends between the receiving end 12 and the transmitting end 14. The manifold housing 16 defines an interior 18 and a plurality of runner walls 20 extending through the interior 18. The runner walls 20 include an upper portion 20a and a lower portion 20b as will be discussed in more detail below.

The tunable intake manifold 10 receives air from a plenum 21 that is fixedly secured to the receiving end 12 of the tunable intake manifold 10. The plenum 21 includes an inner cavity 21a that is used as a reservoir for air. The plenum 21 also includes a plurality of outlets 23 adjacent the receiving end 12 of the housing 16 and each generally corresponding to each of the opposing plurality of ports 17 of the transmitting end 14. While it is contemplated that the tunable intake manifold 10 is used with an internal combustion engine that incorporates fuel injection, it should be appreciated by those skilled in the art that the plenum 21 may hold an air/fuel mixture should the internal combustion engine be fitted with a carburetor or central fuel injector to transmit fuel for combustion.

The air is transmitted through the tunable intake manifold 10 for subsequent combustion in an internal combustion engine operatively connected to the transmitting end 14 of the tunable intake manifold 10. It should be appreciated that while the tunable intake manifold 10 is configured to work in conjunction with an I-4 internal combustion engine, the tunable intake manifold 10 may be designed to work cooperatively with any internal combustion engine configuration having any number of cylinders.

Figure 5:
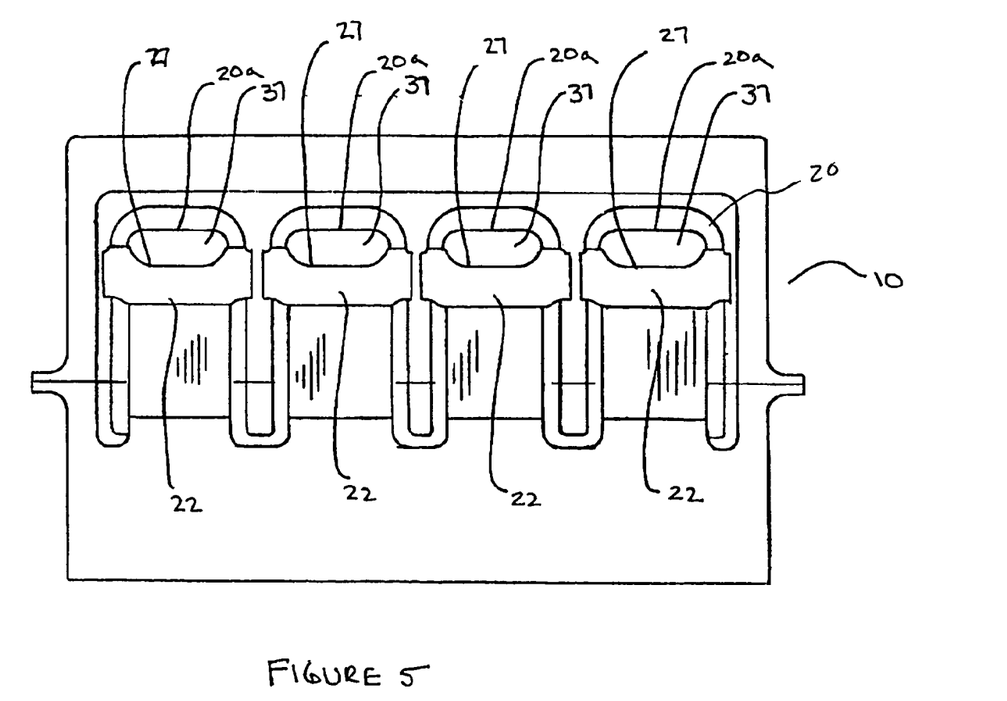
FIG. 5 is an end view of the intake manifold showing the slider in a minimum air position.
Figure 6:
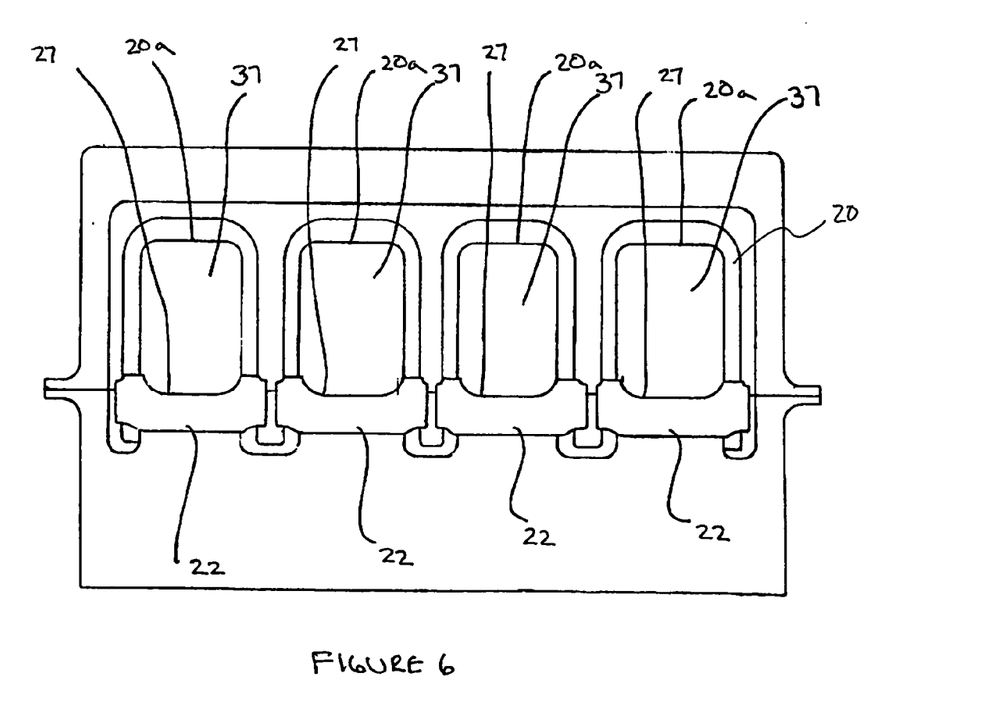
FIG. 6 is an end view of the intake manifold showing the slider in amaximum air position.
Figure 7:
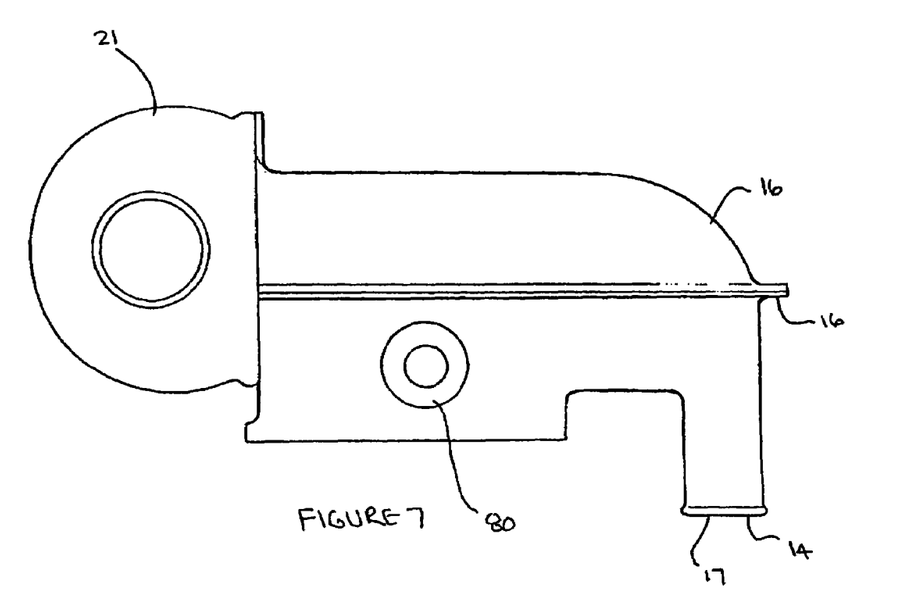
FIG. 7 is a side view of the intake manifold.
Figure 8:
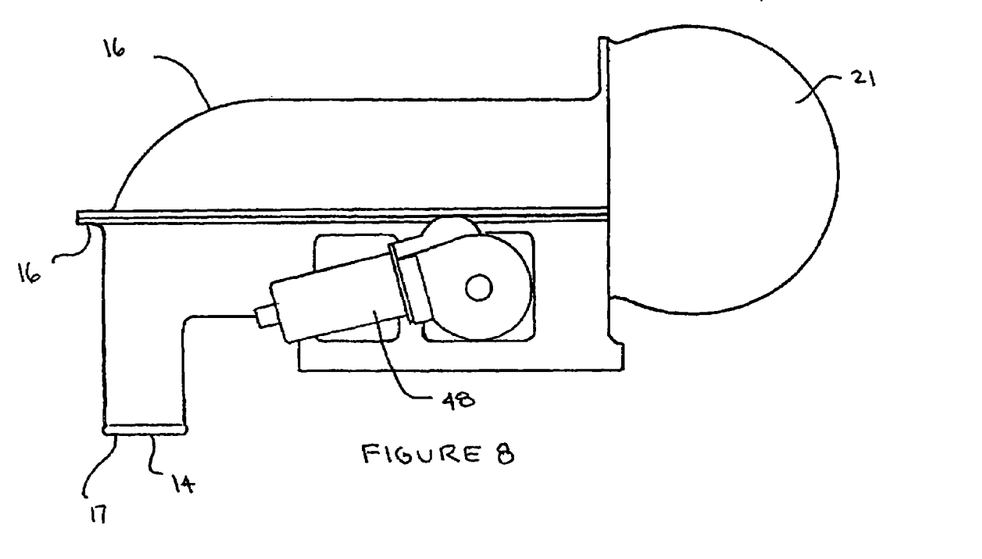
FIG. 8 is a side view of the intake manifold.
Figure 9:
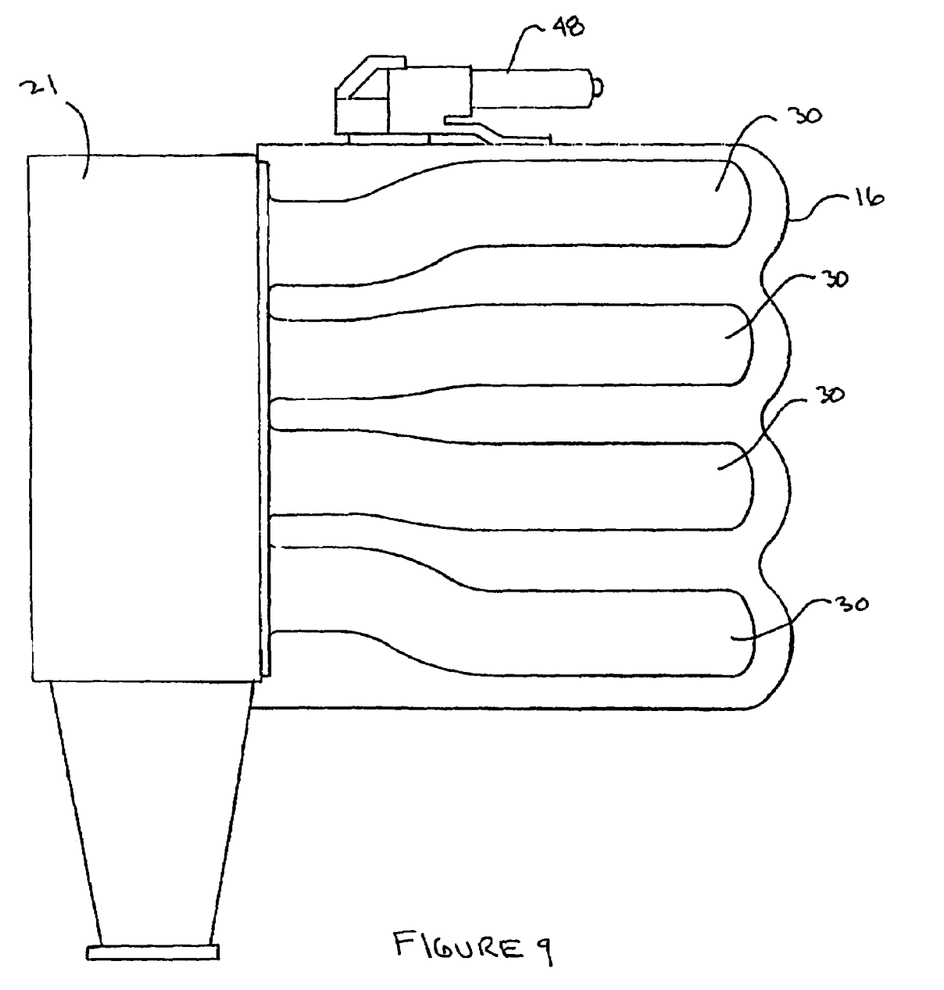
FIG. 9 is a top view of the intake manifold.
Figure 10:
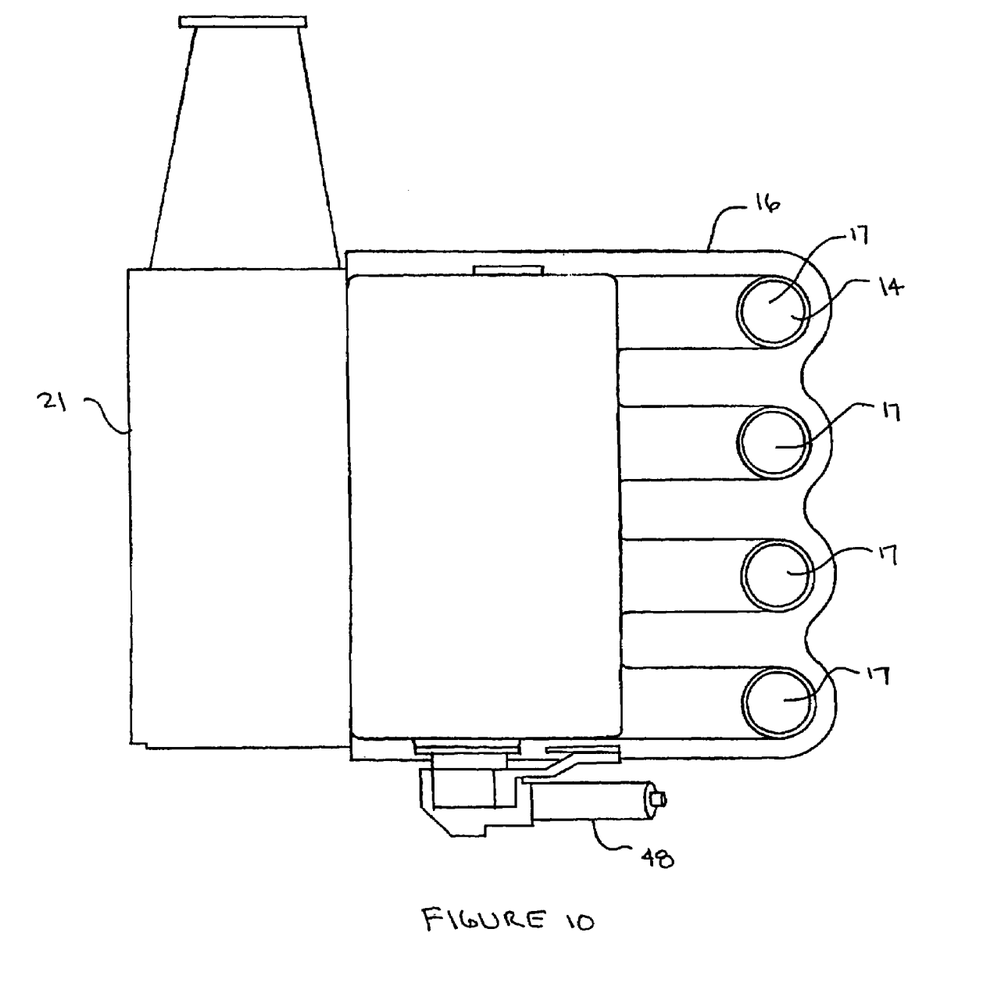
FIG. 10 is a bottom view of the intake manifold.
Figure 11:
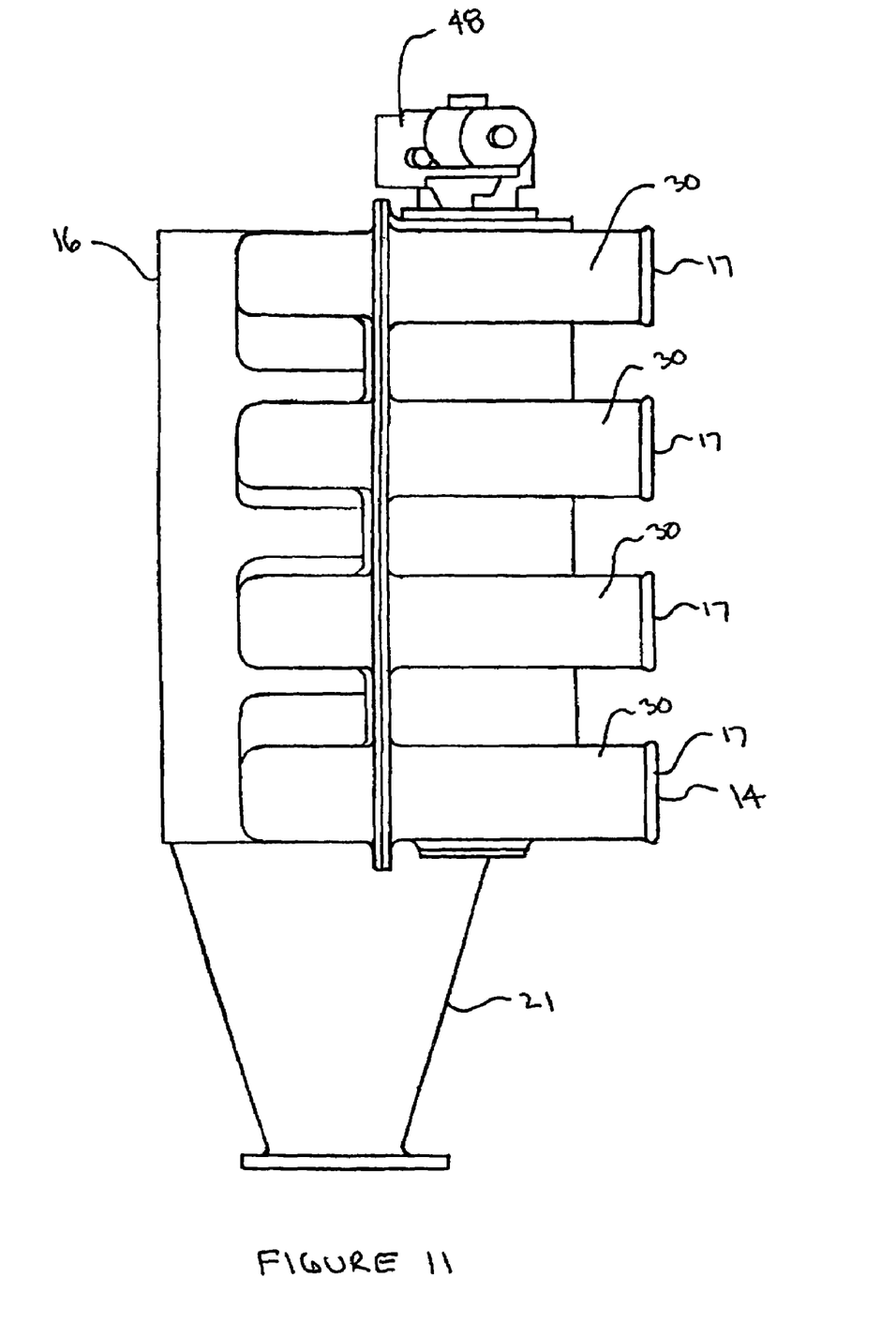
FIG. 11 is a rear view of the intake manifold.
Figure 12:
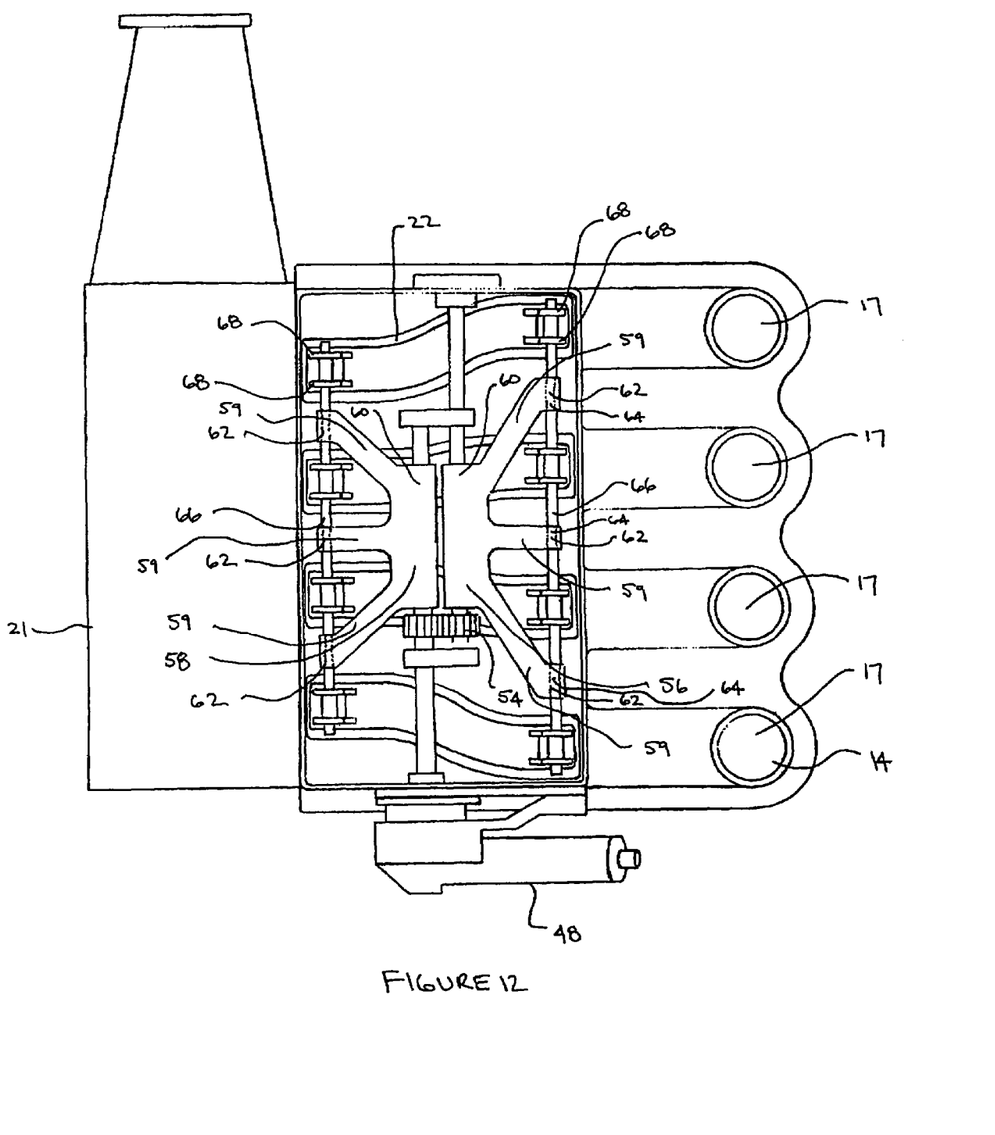
FIG. 12 is a bottom view of the intake manifold with a portion cut away detailing the drive assembly.

The tunable intake manifold 10 also includes a slider 22 defining a plurality of slider walls 27 extending through the interior 18 of the manifold housing 16. Each of the plurality of slider walls 27 is paired with each of the plurality of runner walls 20, including the upper portion 20a and the lower portion 20b. The plurality of runner walls 20 and slider walls 27 cooperate with each other to define a plurality of runners 30. The plurality of runners 30 extend between the respective plurality of ports 17 and plenum outlets 23. Each of the runners 30 defines a defined cross-sectional area and volume. It is through the runners 30 that the air is transported from the plenum 21 to the internal combustion engine. Each of the plurality of runner walls 20 and plurality of slider walls 27 includes a curved end 31, 33. The curved ends 31, 33 of the plurality of runner walls 20 and slider walls 27 define a plurality of openings 37 through which the flow of air enters each of the plurality of runners 30. The size of the plurality of openings 37 contracts and expands with corresponding vertical movement of the plurality of slider walls 27 relative to the plurality of runner walls 20 as shown in FIGS. 5 and 6. The curved ends 31, 33 are lip-shaped to maximize the efficiency of the air passing therethrough by minimizing flow losses.

Figure 13:
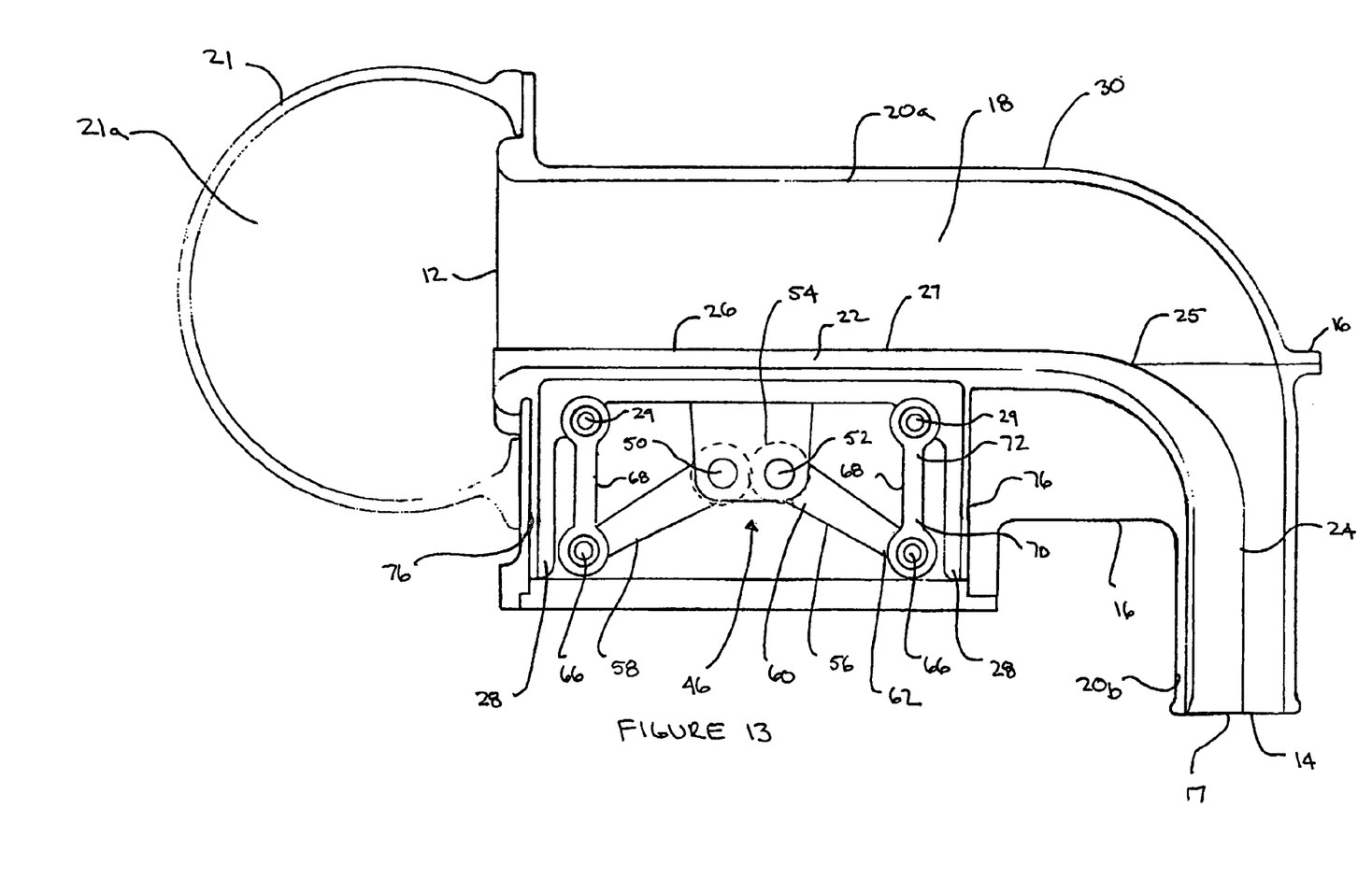
FIG. 13 is a cross sectional view of the intake manifold with the slider in the maximum area.

The slider 22 slidingly engages the manifold housing 16 for movement within the interior 18. Referring to FIGS. 1 and 2, the slider 22 comprises an angled portion 24 separated from a primary portion 26 by a curved portion 25. The curved portion 25 provides a smooth transition between the angled and primary portions 24, 26 to minimize flow losses within the manifold 10. The angled portion 24 moves parallel to the runner walls 20 either at the upper portion 20a or the lower portion 20b adjacent the transmitting end 14 of the manifold 10. Movement of the angled portion 24 parallel to at least a portion of the runner wall 20 eliminates discontinuity in the cross sectional area of the runner 30 at the transmitting end 14 of the manifold 10. The slider 22 also includes two downwardly projecting legs 28 extending from the primary portion 26 of the slider 22. The two downwardly extending legs 28 extend from the primary portion 26 at an angle that matches the angle between the angled portion 24 and the primary portion 26. The matching angular relationship of the legs 28 and angled portion 24 allows the slider 22 to vary the cross sectional area of the runner 30 at the primary portion 26 when moved, as well as allow for parallel movement of the angled portion 24 relative to the lower portion 20b for maintaining a cross sectional area of the runner 30 at the transmitting end 14. As shown in FIG. 2, the angled portion 24 is approximately ninety degrees in relation to the primary portion 26. It is to be understood that alternative angular relationships between the angled portion 24 and primary portion 26 may be utilized by the present invention, as long as the angled portion 24 of the slider 22 moves parallel to at least a portion of the runner wall 20, either 20a or 20b at the transmitting end 14. The two downwardly extending legs 28 abut against an interior surface 76, best seen in FIGS. 13–15, of the manifold housing 16. The interior surface 76 preferably includes raised ridges 77 for containing the two downwardly projecting legs 24 allowing the slider 22 to move vertically relative to the housing 16 without lateral movement of the slider 22. The two downwardly projecting legs 28 also include slots 29 for attaching to a drive assembly 46, as will be discussed in more detail below.

Referring again to FIG. 1, the tunable intake manifold 10 includes a drive assembly, generally shown at 46. The drive assembly 46 is fixedly secured to the manifold housing 16 and is operatively connected to the slider 22 to move the slider 22 vertically relative to the manifold housing 16 to change the defined cross section thereof. Changing the defined cross section of each of the plurality of runners 30 changes the volume of air passing therethrough. Because the slider 22 is infinitely adjustable along the interior surface of the manifold housing 16, an infinite number of adjustments may be made to the size of the runners 30 allowing optimization of volumetric efficiency in the transport of air to the internal combustion engine. This allows optimization over any speed at which the internal combustion engine is operating. While in a preferred embodiment a continuously variable drive is utilized, other drive mechanisms such as two position or set position drives may be used.

Referring to FIGS. 1 and 12 through 15, the drive assembly 46 includes an electronic actuator 48 coupled to a driving shaft 50. The driving shaft 50 is connected to a driven shaft 52 with a gear assembly 54 allowing for synchronous rotation of the driving and driven shafts 50, 52. Inner ends 60 of first and second pivot arms 56, 58 are fixedly secured to the driving and driven shafts 50, 52. The pivot arms 56, 58 include a plurality of fingers 59 that extend laterally to outer ends 62. The outer ends 62 have slots 64 formed therein for receiving connecting rods 66 for linking the pivot arms 56, 58 to the sliders 22. A pair of links 68 are rotationally coupled at first ends 70 to the connecting rods 66. The links 68 are rotationally coupled to the slots 29 of the downwardly projecting legs 28 at second ends 72. While the drive assembly 46 is described as having first and second pivot arms 56, 58 connected to driving and driven shafts 50, 52, other configurations may be utilized to cause the slider 22 to move generally vertical with respect to the runner 30 in the primary portion 26 and parallel to the runner 30 at the angled portion 24. Additionally, the sliders 22 are shown in the preferred embodiment as being independently linked to the drive assembly 46. In an alternative embodiment, the sliders 22 may be integrated with one another to form a unified slider linked to the drive assembly 46.

In the preferred embodiment, the electronic actuator 48 is a motor that receives signals based on the driven shaft 52 position to adjust the air intake based upon other criteria such as, speed of the internal combustion engine, the position of the throttle, etc., and rotates the driving shaft 50 accordingly to move the slider 22 to the proper location to maximize the volumetric efficiency of the internal combustion engine. While an electronic actuator is described in a preferred embodiment, other actuators such as pneumatic, hydraulic, mechanical or other types may be used. In a preferred aspect, one of the driving or driven shafts 50, 52 includes a positional sensor 80, such as that disclosed in U.S. Provisional Application No. 60/548,326 filed on Feb. 27, 2004, and incorporated herein by reference, to determine a position of the slider 22. The position sensor 80 includes a Hall Effect sensor that senses the rotational movement. The Hall Effect sensor includes two sensing elements. The two sensing elements are in quadrature. More specifically, the two sensing elements are disposed 90 degrees from each other with respect to an axis of rotation to which the two sensing elements are equidistant.

A magnetic mount is fixedly secured to element that is rotating. The magnetic mount holds a magnet thereto coaxial with the rotating element. The magnet is disposed in spaced relation to the Hall Effect sensor. It should be appreciated by those skilled in the art that tolerances in aligning the magnet coaxially with the Hall Effect sensor vary depending on the sensitivity thereof and that the magnet could be contacting the Hall Effect sensor should the design so require. The magnet has north and south poles, the intersection of which is generally coaxial with the rotating element and the Hall Effect sensor such that rotation of the Hall Effect sensor will sense the changing magnetic field generated by the magnet which will, in turn, change the signal generated by the circuit on the circuit board allowing identification of the rotational orientation. The physical configuration of the magnet and its poles may vary as long as it is substantially concentric with the Hall Effect sensor and symmetric about the axis of rotation.

By restricting and expanding the volume of the runners 30 using the tunable intake manifold 10, the volumetric efficiency of the internal combustion engine may be maximized or controlled over the entire range of engine speeds. By adjusting the cross section of the plurality of runners 30 via movement of the slider 22, instead of varying the runner length, the function and performance of the tunable intake manifold 10 of the invention is improved over conventional adjustable manifolds by having no increased frictional losses due to increased wall length. The tunable intake manifold 10 is compact in size and simple in construction. Because the length of the runners 30 does not change, the tunable intake manifold 10 retains its compact size throughout its performance range. Further, the tunable intake manifold 10 can be used to maximize the beneficial effects of the reflected suction wave created by the drawing of the piston down into the cylinder of the internal combustion engine. The tunable intake manifold 10 also permits optimization of the velocity of the flow of air entering the internal combustion engine. By doing so, the inertial supercharging of the internal combustion engine can be enhanced.

In operation, the slider 22 may be moved from a maximum area position, as shown in FIG. 6 to a minimum area position, as shown in FIG. 5. While the pictured minimum area position does not completely cut off air into the ports 17, the slider 22 can be designed to completely close off the ports 17 when in the minimum area position. The drive assembly 46 is shown in the maximum area position in FIG. 13. As can be seen, the pivot arms 56, 58 are retracted or rotated downward, such that the slider 22 is positioned at a bottom of the runner 30, allowing the maximum flow of air in the runner 30.

Figure 14:
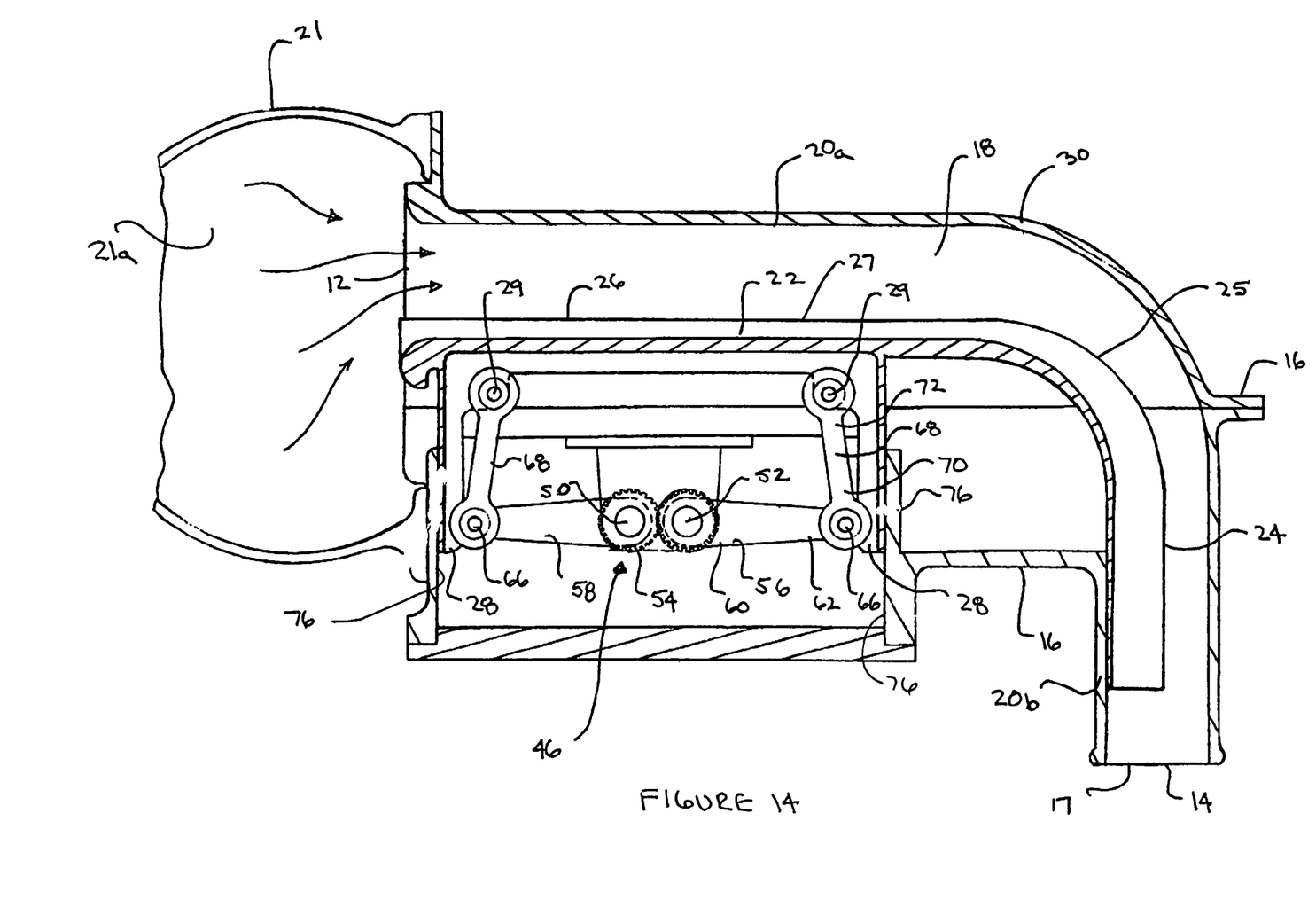
FIG. 14 is a cross sectional view of the intake manifold with the slider in between the maximum and minimum area position.

In FIG. 14, the pivot arms 56, 58 are in a partially pivoted position causing the links 68 to push upward on the primary portion 26 of the slider 22, moving the slider 22 toward the runner wall 20 and reducing the cross section of the runner 30 proximate the primary portion 26 of the slider 22. The angled portion 24 of the slider 22 travels parallel to the runner wall 20 at the transmitting end 14 of the manifold 10. The downwardly projecting legs 28 travel along the interior surface 76 between the raised ridges 77 to prevent lateral movement of the slider 22.

Figure 15:
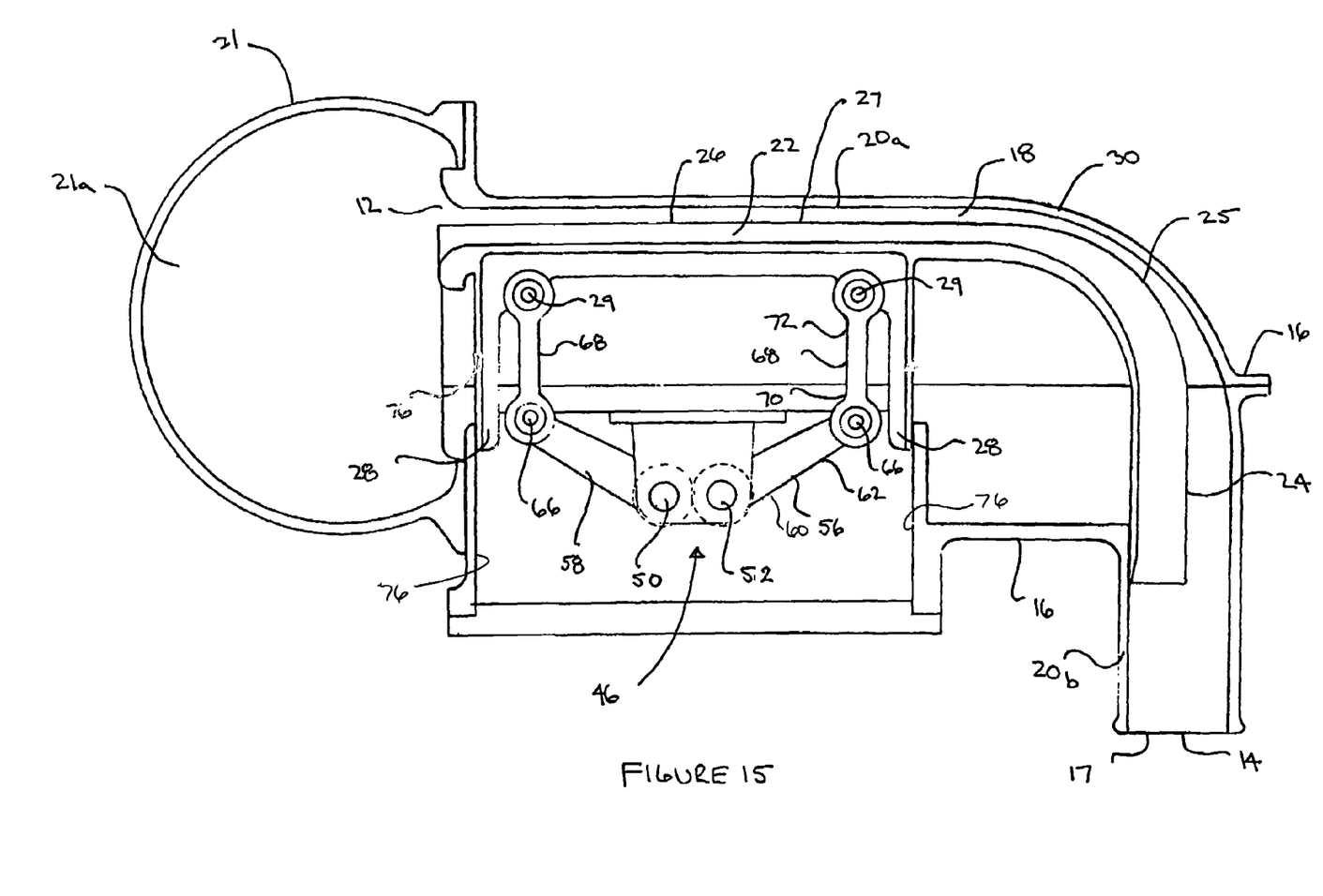
FIG. 15 is a cross sectional view of the intake manifold with the slider in the minimum area.

In FIG. 15, the pivot arms 56, 58 are fully pivoted upward causing the links 68 to push upward on the primary portion 26 of the slider 22. The cross sectional area of the runner 30 is reduced to the minimum area position proximate the primary portion 26 of the slider 22. The angled portion 24 of the slider 22 travels parallel to the runner wall 20 at the transmitting end 14 of the manifold, maintaining a uniform cross section at the transmitting end 14.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A tunable intake manifold for directing a flow of air between a plenum and an internal combustion engine, the tunable intake manifold comprising:

a manifold housing defining an interior extending between a receiving end and a transmitting end, the manifold housing having a runner wall extending through the interior thereof;

a slider comprising a slider wall having an angled portion separated from a primary portion by a curved portion, the slider wall extending through the interior of the manifold housing, the slider wall cooperating with the runner wall to define a runner having a defined cross sectional area for transporting the flow of air therethrough, the slider slidably engaged with the manifold housing for moving the slider wall relative to the runner wall to selectively change the defined cross sectional area of the runner while maintaining said runner at a fixed length, such that the volume of air passing therethrough changes with the movement of the slider, and wherein the angled portion of the slider travels parallel to at least a portion of the runner wall adjacent a transmitting end of the runner.

2. The tunable intake manifold of claim 1 wherein the runner wall includes an upper portion and a lower portion, and the slider travels parallel to the lower portion of the runner wall adjacent the transmitting end of the runner.

3. The tunable intake manifold of claim 1 wherein the slider wall and runner wall include a curved end defining an opening through which the flow of air enters the runner.

4. The tunable intake manifold of claim 3 wherein the size of the opening contracts and expands with corresponding movement of the slider wall relative to the runner wall.

5. The tunable intake manifold of claim 1 wherein the slider includes downwardly projecting legs extending from the primary portion of the slider for abutting an interior surface of the manifold housing for guiding the movement of the slider relative to the runner wall.

6. The tunable intake manifold of claim 5 wherein the downwardly projecting legs extend from the primary portion at an angle that matches the angle defined between the angled portion and the primary portion of the slider.

7. The tunable intake manifold of claim 5 wherein the interior surface includes raised ridges for containing the downwardly projecting legs allowing the slider to move vertically relative to the manifold without lateral movement of the slider.

8. The tunable intake manifold of claim 6 wherein the downwardly projecting legs includes slots formed therein for attaching to a drive assembly.

9. The tunable intake manifold of claim 8 wherein the drive assembly comprises an actuator coupled to a driving shaft, the driving shaft connected to a driven shaft by a gear assembly for allowing synchronous rotation of the driving and driven shafts.

10. The tunable intake manifold of claim 7 including first and second pivot arms secured to the diving and driven shafts, respectively.

11. The tunable intake manifold of claim 10 wherein the first and second pivot arms include a plurality of fingers extending laterally between inner and outer ends.

12. The tunable intake manifold of claim 11 wherein the outer ends include slots formed therein that receive connecting rods for linking the first and second pivot arms to the slider.

13. The tunable intake manifold of claim 12 including a pair of links having first ends coupled to the connecting rods and second ends coupled to the slots formed in the downwardly projecting legs.

14. The tunable intake manifold of claim 9 including a position sensor for detecting movement of the driving or driven shafts.

15. The tunable intake manifold of claim 14 wherein the position sensor comprises a hall effect sensor and a magnetic mount secured to either the driving or driven shafts.

* * * * *